United States Patent [19]

Casper et al.

[11] 4,430,156
[45] Feb. 7, 1984

[54] PROCESS FOR DRYING PUMPABLE SUSPENSIONS

[75] Inventors: Clemens Casper, Krefeld; Dieter Grenner, Dormagen; Gerd-Rüdiger Klette, Krefeld; Edzard Tholema, Odenthal, all of Fed. Rep. of Germany

[73] Assignee: Bayer Aktiengesellschaft, Leverkusen, Fed. Rep. of Germany

[21] Appl. No.: 290,444

[22] Filed: Aug. 6, 1981

[30] Foreign Application Priority Data

Aug. 13, 1980 [DE] Fed. Rep. of Germany ....... 3030662

[51] Int. Cl.³ .............................................. B01D 1/02
[52] U.S. Cl. .................................. 159/47.1; 159/2 R; 159/16 S; 159/26 R; 159/28 C; 159/1 C; 159/DIG. 13; 159/DIG. 40; 203/7; 203/88
[58] Field of Search ................. 159/47, 2 R, DIG. 40, 159/DIG. 13, 1 R, 1 C, 16 S, 28 C, 26 R, 23, 47.1; 203/88, 99, 7, 91; 202/205, 175

[56] References Cited

U.S. PATENT DOCUMENTS 2,868,280 1/1959 Sargent et al. ............... 159/2 R
3,234,994 2/1966 Dance .............................. 159/2 R
3,453,184 7/1969 Gemassmer et al. ........... 159/2 R

OTHER PUBLICATIONS

Chemical Engineers' Handbook, pp. 1436–1439, John H. Perry, editor, McGraw-Hill Book Co. publishers, Third edition, 1950.
Webster's 7th New Collegiate Dictionary, p. 256.
Hackh's Chemical Dictionary–4th Edition, p. 225.
Pressure Pulsations in Pump Systems, Igor J. Karassik, William C. Krutzsch & Warren H. Fraser, pp. 9–83 through 9–86.
Techniques of Process Control–Page S. Buckley–John Wiley & Sons, pp. 138–148 and 155–156.
Chemical Engineers Handbook, Fifth Edition, Robert H. Perry, pp. 5–59, McGraw-Hill Book Company.
Proceedings of the Institute of Mechanical Engineers, vol. 136, pp. 245–331, (1937), Angus.
"Proceedings of the Americal Society of Civil Engineers", Journal of Hydraulics Division, vol. 91, (HY3), pp. 247–270, (1965)–Kinno and Kennedy.
"Hydraulic Transients in Centrifugal Pump Systems", American Society of Mechanical Engineers, vol. 79, pp. 1307–1322, (1956)–Kittredge.
"Complete Characteristics of Centrifugal Pumps and Their Use in the Prediction of Transient Behavior", American Society of Mechanical Engineers, vol. 59, pp. 683–689, (1937)–Knapp.

Primary Examiner—Wilbur L. Bascomb, Jr.
Attorney, Agent, or Firm—Gene Harsh; Lawrence S. Pope

[57] ABSTRACT

In a multiphase flow tube for drying pumpable suspensions to form solids having low residual moisture contents, the process uses brief increases in the pressure of the gas stream to prevent blockages.

5 Claims, 1 Drawing Figure

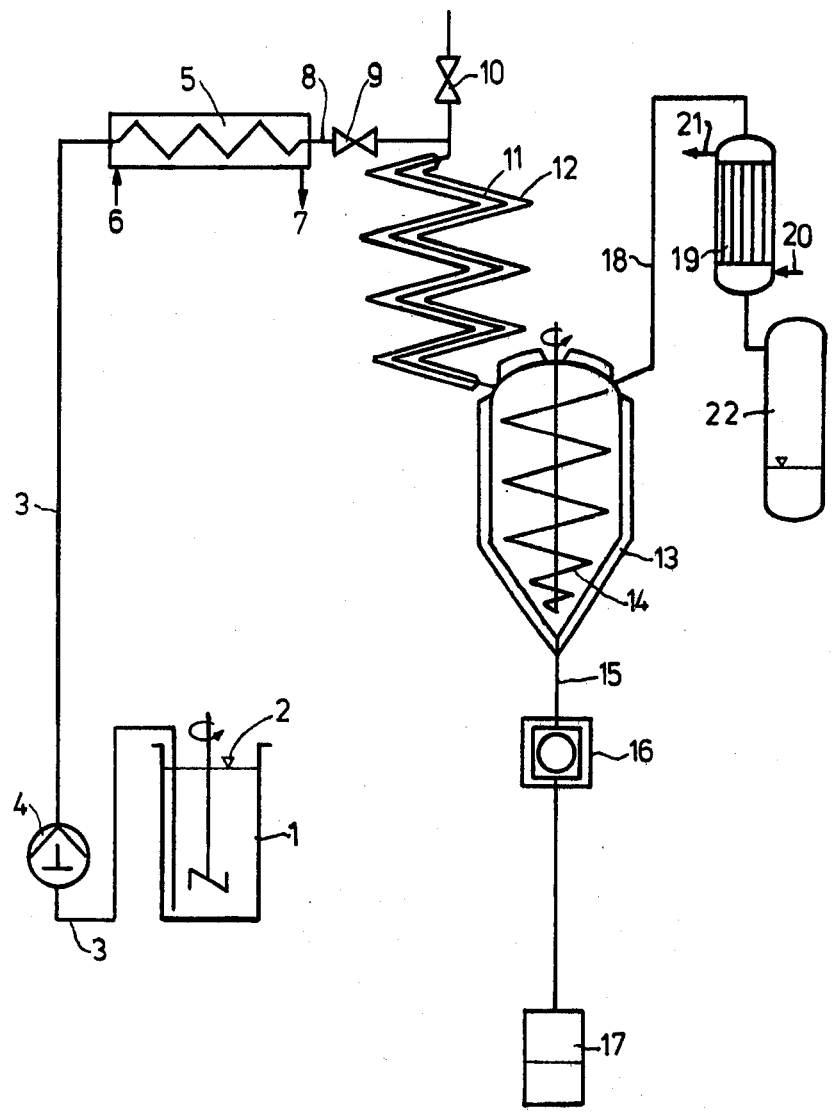

PROCESS FOR DRYING PUMPABLE SUSPENSIONS

This invention relates to a process for drying pumpable suspensions or crystal solutions in which the liquid having a solids content of up to 50% by weight is evaporated during its transport by the indirect application of heat accompanied by the release of pressure.

The drying of crystal solutions and suspensions is carried out by evaporation of the liquid phase. The starting material is in a fluid form, the liquid phase predominating and the solid being dispersed in the liquid. During evaporation, the solid phase is concentrated, and as a result the product gradually changes into a paste in which the solid predominates. The liquid phase present in the interstices keeps the paste together. As evaporation of the residual liquid continues, this internal cohesion collapses and the continuous layer changes into a free-flowing powder.

The main problem is caused by caking of the products on the wall. During the process, most products pass through a very tacky phase in which they adhere to the wall. Unless these accumulations of paste are immediately removed from the wall, both the flow apparatus and also the nozzle can become suddenly blocked.

In the known process of drying on rolls, the starting material is sprayed onto a heated roll, resulting in the formation of a thin layer from which the liquid component evaporates. The solid is then scraped off at a certain point.

This process is attended by the disadvantage that, in most cases, very thin layers of the product have to be mechanically scraped off, and this can have an adverse effect upon the quality of the product. The rotating parts are unreliable in operation. The nozzles used for spraying tend to become blocked. In addition, high investment and operational costs are involved.

Spray drying is another known drying process. In spray drying, the product is heated under pressure and atomised in a nozzle by means of a propellent in the vapour phase, resulting in the formation of droplets from which the liquid phase evaporates through the release of pressure and the input of heat by the vaporous propellent. The solid flows downwards into a large container in which drying is completed and is then collected at the bottom of the container and removed from the system by a discharge unit.

Spray drying is extremely sensitive to any changes in the process conditions with the result that it is a very expensive process to operate. The use of propellent vapour is by no means inexpensive. The solid which accumulates has a low powder density and is difficult to pack.

Paddle dryers with a self-drying element are also commonly used for drying. In dryers of this type, paddles are mounted on a shaft and keep the product moving, subject it to transverse mixing and keep the wall free from crusts. The vapour formed is let off through a so-called vapour dome. Self-cleaning elements are provided to prevent crusts from forming on the blades.

In paddle dryers, heat-sensitive products are able to settle on the rotating parts and, after having been exposed to heat for a prolonged period, become detached again and are then capable of impairing the quality of the product to a considerable extent. The rotating parts are unreliable in operation, in addition to which the investment and operating costs are high.

The object of the present invention is to provide a thermal process for drying free-flowing suspensions and crystal solutions in a simple static apparatus in which the end product accumulates in a paste-like or free-flowing form.

According to the invention, this object is achieved in that, in a multiphase flow tube, in which the ratio of circumference to cross-sectional area is from 0.05 to 1.5 [mm$^{-1}$], and with a throughput of from 2 to 50 kg/h per square centimeter of cross-sectional area, any plug-like deposits in the tacky paste-to-solid transitional zone subjected to intense heating are sheared off from the wall of the flow tube by brief increases in pressure of from 0.5 to 10 bars beyond the system pressure of 5 to 20 bars, and in that the moisture still present in the solid particles is then removed by evaporation in the flow tube to a residue of 0.1% by weight.

It is surprising to any expert that it is possible to obtain a solid having a very low liquid content (up to ~0.1% by weight) from a thinly liquid suspension in a narrow tube, even though tacky deposits accumulate in the critical transition phase and in fact ought to result in sudden blockage and hence in termination of the drying process. It is also surprising that ex-products of which the self-ignition temperature corresponds substantially to the drying temperature may also be processed.

The reason for this is that it has been surprisingly found that even slight increases in pressure occuring at certain time intervals for cleaning the flow tube are sufficient to obtain intensive drying. To prevent the formation of crusts, a high mass flow density, $\dot{m} = \delta . u$, where $\delta$ is the density and $u$ is the velocity of flow, has proved to be of advantage. In addition, a fairly high heat flow density, achieved by a high temperature gradient from the heating medium to the product limited solely by the sensitivity of the product to heat, ensures that the critical transition zone is as small as possible.

The advantage that the product flowing through a flow tube has virtually the same residence time is unaffected so that high product quality is guaranteed. Foaming is prevented by the gradual release of the high pressure. At the same time, the vapour given off from the product is used to assist its flow. In addition, any required temperature profile may be adjusted along the flow tube without any significant technical problems.

The tube is simple to manufacture and reliable in operation through the absence of any rotating parts. The operating costs are favourable because the waste vapour is used almost exclusively as the transport medium.

In one particular embodiment of the process, the increase in pressure is produced by vapour, including any propellent gas used, flowing at a rate of at least 100 m/s before reaching the transition zone.

Normally, the product is preheated and vented as it enters the flow tube. As a result, part of the product evaporates and as it were drives on the liquid left over. The rates of flow of the vapour in the tube which are increased through continued evaporation of the liquid to as high as Mach one are sufficient even at 100 m/s to shear off any blocking deposits formed after a build up of pressure. This process may, of course, be assisted by an additional gas which is inert to the product. Unless blockage occurs, the process of evaporation is accelerated by the rapid removal of the vapours. On the other hand, the same vapour is used for shearing off plugs from the wall. Accordingly, the process as a whole is extremely economical.

In one preferred embodiment of the process, a vapour from an external source is added at certain time intervals for starting off detachment of the solid.

By adding a vapour from an external source at regular intervals to start off detachment of the solid, it is possible more easily to remove any crusts formed from the wall.

In another embodiment of the process, a pulsating pressure is generated by means of a pump.

The pulsating streams of product are able to prevent the formation of crusts in the tube, even at the entrance thereof, so that there is no danger whatever of plug formation.

In another embodiment, the flow tube is coiled with a ratio of tube diameter to coil diameter of from 0.1 to 0.5.

By virtue of the constant coiling of the tube, any liquid droplets or solid particles which may be entrained under the effect of the fairly intense gelation forces are immediately returned to the wall by the centrifugal forces, so that they are re-subjected to the evaporation process before they can be entrained by the gas stream.

One example of an embodiment of the invention is described in detail in the following with reference to the accompanying drawing, wherein:

FIG. 1 diagrammatically illustrates an installation for carrying out the process according to the invention.

In the vessel 1, the suspension is stirred by the stirrer 2 for homogenisation and for avoiding thixotropy and is delivered through the pipe 3 to the heat exchanger 5 by means of the pump 4, the heat exchanger 5 being supplied with steam through the pipes 6 and 7. A laminar flow is generated in the coiled tube 11 through the pipe 8 with its relief valve 9, steam optionally being added through the valve 10. Evaporation takes place at intervals in the heating zones 12. In the following separator 13, which is provided with a scraping coil 14, the product is separated into solids, which fall through the pipe 15 into the container 17 via the lock 16, and vapour which, after passing through the pipe 18 and the condenser 19, with its cooling water connections 20 and 21, is collected as a liquid in the container 22.

It is, of course, also possible to arrange several such flow tube/separator systems behind one another, in which case the vapours from the preceding stage may be used to save energy in the following stage.

EXAMPLES

1. Drying of organic dye

Starting material:
 a 50% aqueous solution of an organic dye
Apparatus:
 coiled flow tube
 internal diameter 9 mm
 length of stretched-out tube 3 m
Operating conditions:
 Heating of the starting material to 98° C.
 Heating medium: Marlotherm oil
 Temperature of heating medium: 165° C.
 System pressure: 12–20 bars
 Separator pressure: 170 mbars
 Separator temperature: 60° C.
 Product throughput: ~8 kg/h
Residual moisture content of the product: 3%

2. Working up residues from effluents

Starting material:
 an aqueous solution consisting of 90% of water, 6.1% of NaCNS, 3.5% of NaCl and 0.4% of organic residues
Apparatus:
 coiled flow tube
 internal diameter 15 mm
 stretched-out length 6 m
Operating conditions:
 Heating of the starting material to 115° C.
 Heating medium: condensing saturated steam
 Temperature of heating medium: 125° C.
 System pressure: 12–16 bars
 Separator pressure: 250 mbars
 Separator temperature: 70° C.
 Product throughput: 38 kg/h
End product obtained:
 a solid paste having a residual moisture content of 20%.

In another test, it was found that a free-flowing end product having a residual moisture content of ~1% could be obtained with a temperature of the heating medium of 160° C.

3. Drying of an organic dye intermediate

Starting material:
 a 50% aqueous solution of an organic dye (1-amino-2-bromo-4-hydroxy-anthraquinone)
Apparatus:
 coiled flow tube
 internal diameter 9 mm
 length of stretched-out tube 3 m
Operating conditions:
 Heating of the starting material to 98° C.
 Heating medium: Marlotherm oil
 Heating medium temperature: 165° C.
 System pressure: 12–20 bars
 Separator: 170 mbar
 Condenser: 60° C.
 Product throughput: 8 kg/h
Residual moisture content of the product: 0.1%.

We claim:

1. A process for drying pumpable suspensions or crystal solutions in which the liquid having a solids content of up to 50% by weight is evaporated during transport by the indirect application of heat accompanied by the release of pressure, characterised in that, in a multiphase flow tube, in which the ratio of circumference to cross-sectional area is from 0.05 to 1.5 [mm$^{-1}$], and with a throughput of from 2 to 50 kg/h per square centimeter of cross-sectional area, any plug-like deposits in the tacky paste-to-solid transitional zone subjected to intense heating are sheared off from the wall of the flow tube by brief increases in pressure of from 0.5 to 10 bars beyond the system pressure of 5 to 20 bars, and in that the moisture still present in the solid particles is then removed by evaporation in the flow tube to a residue of 0.1% by weight.

2. A process as claimed in claim 1, characterised in that the increase in pressure is produced by vapour, including any propellent gas added, flowing at a rate of at least 100 m/s before reaching the transition zone.

3. A process as claimed in claim 1, characterised in that a vapour from an external source is added to said flow tube at certain time intervals to start off detachment of the solid.

4. A process as claimed in claims 1, 2 or 3, characterised in that the flow tube is coiled with a ratio of tube diameter to coil diameter of from 0.1 to 0.5.

5. A process for producing essentially dry material from pumpable suspensions or crystal solutions comprising
   (a) feeding said suspension or solution having a solids content of up to 50% by weight to a multiphase flow tube at a pressure of between 5 and 20 bars, wherein said flow tube has a ratio of circumference to cross-sectional area of between 0.05 and 1.5 mm$^{-1}$ and has an unconstricted downstream terminus whereby the material being processed experiences a pressure drop during its transit of the tube;
   (b) maintaining a throughput in said flow tube of between 2 and 50 kg/h per square centimeter of cross-sectional area;
   (c) supplying sufficient indirect heat to said flow tube to affect evaporation to no more than 0.1 weight percent of liquid; and
   (d) applying pressure surges of between 0.5 and 10 bars to the material in the flow tube of sufficient magnitude duration and frequency to shear off the plug-like deposits which form in the portion of said tube in which the material being processed is undergoing a transition from a tacky paste to a solid and prevent blockage of the tube.

* * * * *